US012001571B2

(12) United States Patent
Kuo et al.

(10) Patent No.: US 12,001,571 B2
(45) Date of Patent: *Jun. 4, 2024

(54) SYSTEM AND DEVICE FOR DATA PROTECTION AND METHOD THEREOF

(71) Applicant: TAIWAN SEMICONDUCTOR MANUFACTURING COMPANY LTD., Hsinchu (TW)

(72) Inventors: Wen-Chang Kuo, Hsinchu (TW); Chiang Kao, Hsinchu (TW); Kuo Hsiung Chen, Hsinchu (TW); Ho-Han Liu, Hsinchu (TW); Ti-Yen Yang, Hsinchu (TW); Jo-Chan Liu, Hsinchu (TW); Chi-Pin Wang, Tainan (TW); Yao-Hsiung Chang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,211

(22) Filed: Nov. 3, 2022

(65) Prior Publication Data

US 2023/0111388 A1  Apr. 13, 2023

Related U.S. Application Data

(63) Continuation of application No. 16/412,753, filed on May 15, 2019, now Pat. No. 11,494,497.

(60) Provisional application No. 62/691,460, filed on Jun. 28, 2018.

(51) Int. Cl.
*G06F 21/60* (2013.01)
*G06F 21/32* (2013.01)
*H04W 48/04* (2009.01)

(52) U.S. Cl.
CPC ............ *G06F 21/602* (2013.01); *G06F 21/32* (2013.01); *H04W 48/04* (2013.01)

(58) Field of Classification Search
CPC ....... G06F 21/602; G06F 21/32; H04W 48/04
See application file for complete search history.

(56) References Cited

U.S. PATENT DOCUMENTS

2009/0327678 A1* 12/2009 Dutton .................. G06F 21/575
713/2
2010/0175116 A1*  7/2010 Gum ..................... H04L 63/107
726/6

(Continued)

FOREIGN PATENT DOCUMENTS

CA           2600116 A1 *  3/2008  ............. G06F 21/35

*Primary Examiner* — Hee K Song
(74) *Attorney, Agent, or Firm* — WPAT Law; Anthony King

(57) ABSTRACT

A method of operating a user device includes: receiving a command from a user to power on the user device, wherein the user device includes information on a restricted zone associated with the user device; detecting, by a monitoring entity of the user device without involvement of any device external to the user device, whether the user device is located within the restricted zone in response to the user device being powered on and before an operating system of the user device is executed; and granting access of the user to the user device by the monitoring entity in response to detecting the user device as being within the restricted zone.

20 Claims, 4 Drawing Sheets

(56) References Cited

U.S. PATENT DOCUMENTS

2014/0208397 A1\* 7/2014 Peterson ............... H04W 12/30
    726/4
2018/0234431 A1\* 8/2018 Meredith ................ H04L 41/28

\* cited by examiner

SYSTEM AND DEVICE FOR DATA PROTECTION AND METHOD THEREOF

PRIORITY CLAIM AND CROSS-REFERENCE

This application claims priority to U.S. patent application Ser. No. 62/691,460 filed Jun. 28, 2018 and is a continuation application of U.S. non-provisional patent application Ser. No. 16/412,753 filed May 15, 2019, the disclosures of which are hereby incorporated by reference in its entirety.

BACKGROUND

Personal devices are essential for many individuals and enterprise employees to carry and process data due to their convenience and desirable performance. As the personal devices are provided to promote working efficiency and user experience, the issue of data protection has become an important issue. Many measures for ensuring authorized data access of personal devices have been proposed, but such measures have been deemed unsuitable due to cost or difficulty of use. For many users, the security measures may pose obstacles to normal use of the personal devices. As a result, personal users or enterprises may bypass the security measures in their personal devices due to inconvenience, or experience frequent downtime of their personal devices after incurring high installation costs related to the security measures. Therefore, an improved and efficient data protection system is needed.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
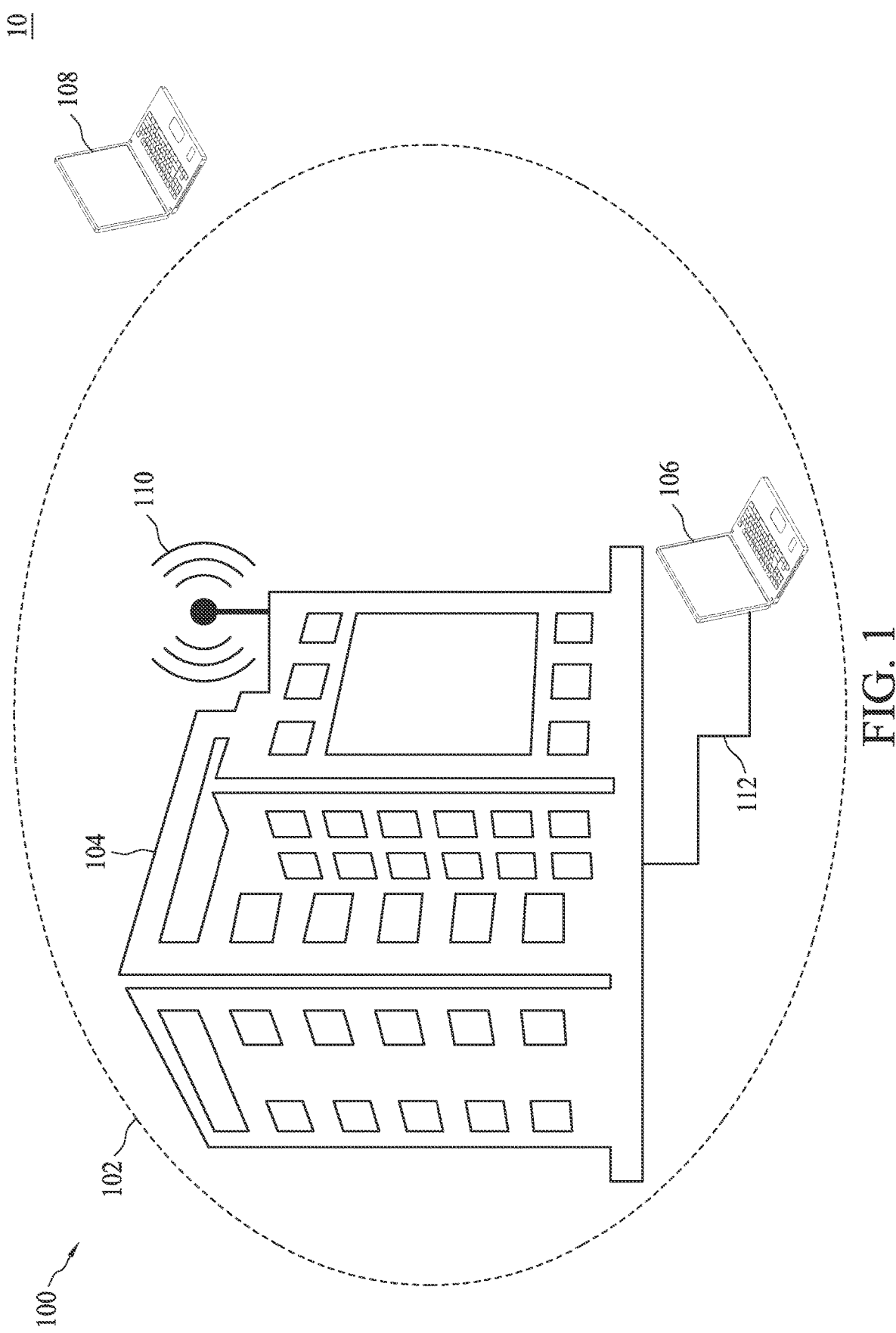
FIG. 1 is a schematic diagram showing an application scenario of a data protection system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms "couple," "coupled" and "coupling" used throughout the present disclosure describe the direct or indirect connections between two or more devices or elements. In some cases, a coupling between at least two devices or elements refers to mere electrical or conductive connections between them and intervening features may be present between the coupled devices and elements. In some other cases, a coupling between at least two devices or elements may involve physical contact and/or electrical connections.

The present disclosure discusses a system and a method thereof for protecting data in user devices. Particularly, the present disclosure aims to resolve data-protection issues occurring in an enterprise-based working environment where access to the user devices is tightly controlled and granted only to authorized personnel. Among existing data-protection measures, widely-adopted password-based approaches require the user to enter a string of symbols or characters as the password of the user device, and then grant the access to the user in response to detecting that the input password matches the preset password stored in the user device or a server connected to the user device. However, the password-based security approach does not function smoothly when the user device is shared by more than one user, e.g., multiple eligible colleagues. As the task of regularly changing the password and distributing the updated password to other eligible users is troublesome and inefficient, there is low motivation to change the password periodically. The risk of vulnerability of the data security for the user device is thus inevitably increased. In addition, another, more critical problem of using passwords to protect data in the user devices is that the password cannot prevent a company employee from abusing or leaking confidential information in the password-protected device because such employee is presumably eligible to access the confidential information.

Another data-protection scheme that bypasses the requirement of passwords is a client-server framework, in which the user data is moved outside the user device rather than being stored in the storage device of the user device. Each of the user devices under the server-client framework is equipped with a network interface and transceiver components that function to maintain a connection to a server in the network of the enterprise; all required information is stored on the server and is accessible to certain users based on their security level. Under such a framework, an actor intending to steal confidential data by hacking the user device will not be successful. As a result, the likelihood of data abuse or data hacking, either voluntarily or negligently, is significantly decreased. In addition, to sustain the service quality and enhance user experience of accessing the server, the network should be kept functioning as stably as possible. Such goal of a stably-running system can be achieved only at a high price of investment in hardware (e.g., servers, storage and network equipment) and software (e.g., commercial virtualization tools). In other words, the overall expenditure of deploying the client-server framework is a great concern. Based on the foregoing, there is an urgent need to revisit the management of enterprise-level user devices and seek a better balance between the user experience, performance of the security system and infrastructure investment.

In the present disclosure, a data protection system is established. A device-initiated data protection scheme is proposed in which one or more monitoring entities are activated or launched to perform the monitoring operations simultaneously or in succession. The monitoring entity can be implemented as a hardware-based monitoring unit including a coordinate receiver and other signal-processing components and performing periodic or event-based monitoring, or functioning as computer programs stored in the storage device of the user device and launched for performing periodic detection or event-based monitoring. Furthermore, the device-initiated data-protection scheme limits access to the user device if it is detected that the user device is located outside a restricted zone or poses a potential risk. Such limitation measure is performed in a compulsory manner without authority of the user. The types of access limitation can vary, depending on the level or the sustaining period of the risk conditions detected. The proposed data protection scheme does not require the password for the user device, yet is more effective than the password-based approaches because confidential data can be better protected from being stolen or leaked by a user. Moreover, the cumbersome security examination steps that operate on the user devices are eliminated, and compliant employees are therefore able to conveniently access the user devices. As a result, the security level and the user experience are both improved.

FIG. 1 is a schematic diagram showing an application scenario 10 for a data protection system in accordance with some embodiments. A company or an enterprise 100 owns its offices, laboratories or factories in one or more buildings 104, and the employees of the company 100 work in the offices, laboratories or factories. Moreover, the company 100 sets up and operates an information technology (IT) system (see FIG. 2) distributed in the offices, laboratories or factories and comprised of at least one server and several user devices, including the exemplary user devices 106 and 108. The IT system also includes one or more wireless networks 110 or wired networks 112 connecting the servers and the user devices in the IT system. In an embodiment, the network 110 includes network interface equipment, cables, wired/wireless transceivers, and other network components. In an embodiment, the servers at least include a domain name server, a key server, a domain controller and a data server. In an embodiment, confidential data, such as product design and manufacturing data, employee statistics, and marketing and client information, of the company 100 is stored in the servers and is accessible to one or more eligible employees of the company 100 based on the personnel accessibility level and the security level of the data.

In the present embodiment, the user device 106 or 108 belongs to and is managed by the IT system of the company 100. The user device 106 or 108 can be a fixed or portable device that can store data, such as a desktop computer, a cellular phone, a notebook computer, a tablet computer, a personal digital assistance (PDA), a portable storage device, a video/audio signal transceiver, or the like. In an alternative embodiment, the user device 106 or 108 is a fixed device such as a desktop computer, a wired-line communication device, a terminal of a server, or the like. In an embodiment, the user device 106 or 108 is equipped with wired or wireless interfaces for communicating with managing entities, such as a server, of the company 100 through physical wire lines or wirelessly. In an embodiment, the device 106 or 108 can be moved outside the buildings 104.

In an embodiment, a zone 102 is defined as a safe area in a workplace environment for the company 100. It is assumed that the employees can safely access or share the confidential data within the zone 102 and the risk of leaking sensitive data or suffering from data hacking is minimized because unrecognized or malicious third parties outside the zone 102 will be blocked. The zone 102 can be set up by physical or virtual boundaries. In an embodiment, the zone 102 is defined as a geological range covered by a union of the buildings 104. In an embodiment, the zone 102 includes a neighborhood of the building 104, such as a parking lot or a campus of the company 100. In an embodiment, the zone 102 is defined by a range within the coverage of signals of the wireless network 110. In an embodiment, the zone 102 is defined by a range within the reach of the wired network 112 of the company 100. In an embodiment, the zone 102 is defined as a controlled area to be accessed only by the employees of the company 100.

In the depicted embodiment, the user device 106 is detected within the zone 102 because the user device 106 can be accessed at least through the wired network 112 or the wireless network 110 and thus is determined as within a restricted safe zone. The user device 108 is moved outside the zone 102 because the user device 108 cannot be accessed either through the wired network 112 or the wireless network 110, and thus is determined as being outside the safe zone.

Figure 2:
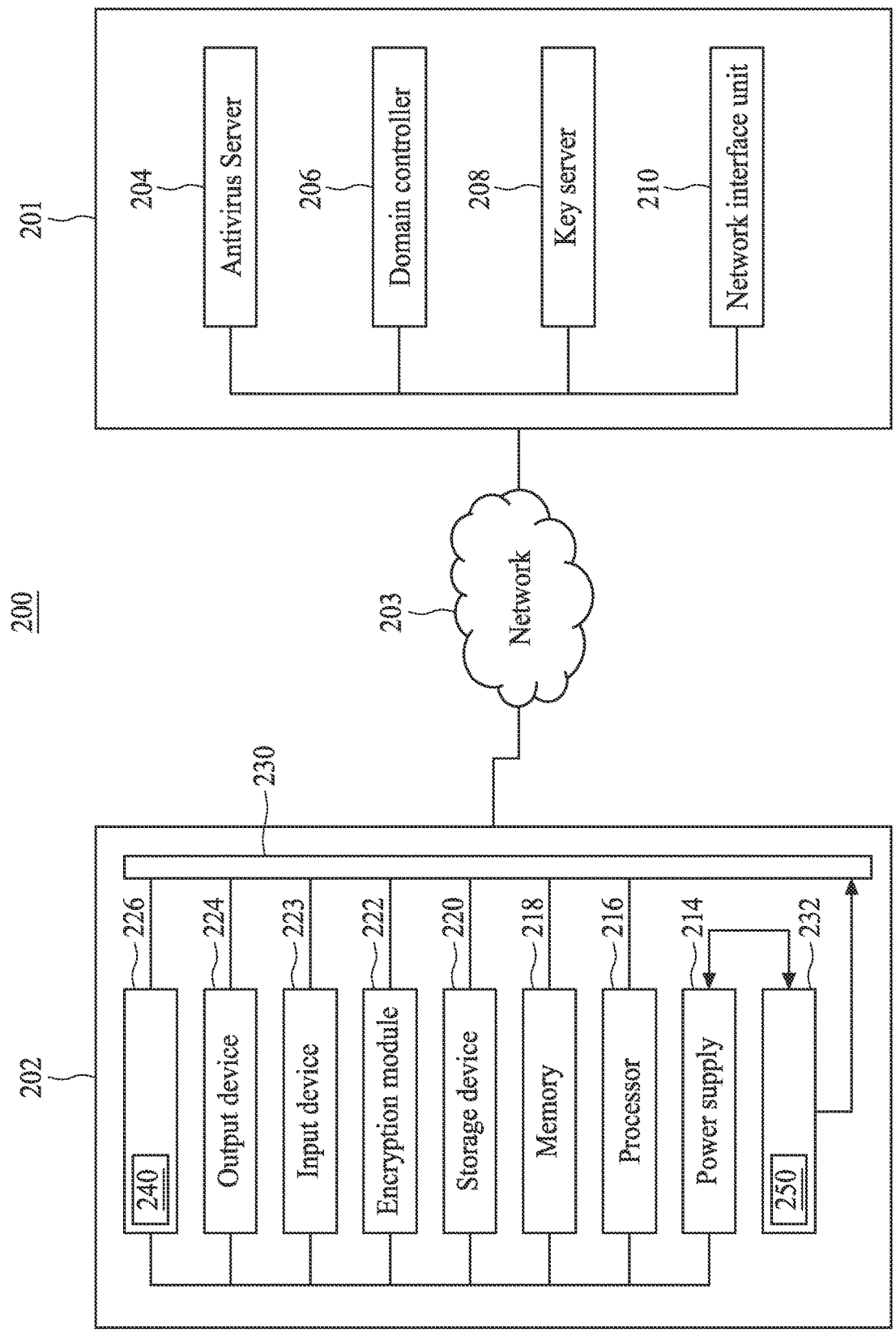
FIG. 2 is a schematic diagram of a data protection system, in accordance with some embodiments.

FIG. 2 is a schematic diagram of a data protection system 200, in accordance with some embodiments. The data protection system 200 includes a company IT system 201 and an exemplary user device 202. The company IT system 201 is a private network managed by a company or enterprise, such the company 100. In an embodiment, the company IT system 201 provides connections for use within the company 100 and protects the company 100 from attacks or hacking from the outside. In an embodiment, the company IT system 201 includes a plurality of user devices (including the user device 202) and various servers, such as an antivirus server 204, a domain controller 206 and a key server 208. Other types of servers are also possible, such as a web server, a proxy server, a domain name system (DNS) server, a dynamic host configuration protocol (DHCP) server, an Email server, a network time protocol (NTP) server, a printer server, and an operation system patch server. The company IT system 201 further includes a network interface unit 210 coupled to the antivirus server 204, the domain controller 206, the key server 208, and other servers as mentioned above. In an embodiment, the network interface 210 is further configured to connect the servers of the company 100 to the user device 202. The network interface unit 210 may include the wired network 112 and the wireless network 110 in FIG. 1. In an embodiment, the network interface unit 210 includes transceivers or modems configured to transmit and/or receive data or control signals, through either the wired or the wireless channel, to communicate directly with the user device 202. In an embodiment, the company IT system 201 and the user device 202 may be connected through a network 203. In an embodiment, the network 203 is a public network and may be public internet, a cellular network, Wi-Fi, combinations thereof, or the like.

In an embodiment, the user device 202 is similar to the user device 106 or 108 in FIG. 1. The user device 202 includes a power supply 214, a processor 216, a memory 218, a storage device 220, an encryption module 222, an input device 223, an output device 224, a network interface unit 226, a power control unit 232 and a bus 230. The bus 230 provides channels for transferring data and control signals between the power supply 214, the processor 216, the memory 218, the storage device 220, the encryption module 222, the input device 223, the output device 224, the network interface unit 226 and the power control unit 232, and connects these components to each other.

In an embodiment, the power supply 214 provides operating power to other components of the user device 202, e.g., through the bus 230 or a power line. The power supply 214 may include a power storage unit, such as battery, or a power generating unit, such as a solar panel. In an embodiment, the power supply 214 is shut down by the power control unit 232 in response to detecting a risk condition of the user device 202.

The memory 218 is configured to store program instructions to be executed by the processor 216 and data accessed by the program instructions. In some embodiments, the memory 218 is a read-only memory (ROM) device which stores start-up instructions for the user device 202 when the user device 202 is turned on, such as basic input/output system (BIOS) that is configured to perform hardware initialization during the start-up procedure of the user device 202. In alternative embodiments, the memory 218 includes a random access memory (RAM) device, a volatile storage device or a non-volatile storage device, used for storing programs or data of the user device 202.

In some embodiments, the storage device 220 includes a non-transitory computer readable storage medium, for example, a flash memory, a magnetic disk, an optical disk or the like. The storage device 220 is configured to store program instructions executable by the processor 216 and data accessed by the program instructions. For example, the storage device 220 stores instructions of an operating system of the user device 202, in which the operating system manages the hardware and software resources of the user device 202 and provides common software services to users of the user device 202. In an embodiment, the storage device 220 stores instructions of a monitoring operation acting as one form of the monitoring entity of the user device 202. When the instructions are executed, the monitoring operation is configured to detect a risk level of the user device 202 and to limit the access to the components of the user device 202. The monitoring operation will be explained in greater detail in the following descriptions.

The processor 216 is configured to execute program instructions that are stored in the memory 218 or the storage device 220. The processor 216 may be a central processing unit (CPU), a microprocessor or an application specific integrated circuit (ASIC). In an embodiment, when the user device 202 is turned on, the processor 216 is configured to load start-up instructions from the memory 218 to perform hardware and firmware initialization. In an embodiment, during or after the start-up procedure of the user device 202, the processor 216 is configured to load program instructions from the operating systems stored in the storage device 220 according to the start-up instructions. In an embodiment, the processor 216 is configured to execute instructions of the monitoring operation, wherein the monitoring operation detects the risk level of the user device 202 and performs operations to limit access to the components of the user device 202, such as the power supply 214, the storage device 220, the input device 223 and the output device 224. In an embodiment, the monitoring operation is executed on the operating system.

The network interface unit 226 is configured to communicate control and data signals of the user device 202 with a foreign entity, such as the company IT system 201 or the network 203. In an embodiment, the network interface unit 226 includes a transceiver 240 configured to transmit signals that have been processed and receive signals to be processed. The transceiver 240 may include signal processing elements, e.g., an antenna, an analog-to-digital converter (ADC), a digital-to-analog converter (DAC), a modem, a signal mixer, an up-converter, a down-converter, or the like.

In an embodiment, the network interface unit 226 is configured to communicate with the company IT system 201 through the counterpart component, i.e., the network interface unit 210. Although not separately shown in FIG. 2, the network interface unit 210 may also include a transceiver configured to transmit signals that have been processed and receive signals to be processed. In an embodiment, the transceiver of the network interface unit 210 may include signal processing elements, e.g., an antenna, an analog-to-digital converter (ADC), a digital-to-analog converter (DAC), a modem, a signal mixer, an up-converter, a down-converter, or the like.

The input device 223 includes an input interface configured for enabling human-machine interaction with the user. In some embodiments, the input device 223 is configured to receive inputs of various kinds and in various forms, and may include a keyboard, a mouse, a touch pad, a microphone, a fingerprint sensor or a camera. In an embodiment, the input device 223 is disabled in response to detecting a risk condition of the user device 202, thereby limiting access to the user device 202 and protecting the data in the user device 202.

The output device 224 includes various output interfaces configured for providing signals or data to external devices or users. In some embodiments, the output device 224 includes, for example, a display, a printer, an audio interface unit, a speaker, and other devices. In an embodiment, the output device 224 is disabled in response to detecting a risk condition of the user device 202 thereby limiting access to the user device 202. For example, a display of the user device 202 is locked or turned off such that the confidential information stored in the storage device 218 will not be visually leaked to a malicious viewer. Alternatively, a speaker of the user device 202 is locked or turned off such that the auditory confidential information stored in the storage device 218 will not be leaked to a malicious listener.

In an embodiment, the encryption module 222 includes encryption/decryption circuits or programs configured to perform encryption and decryption tasks of the storage device 220. In an embodiment, the encryption module 222 is implemented as a stand-alone semiconductor chip that performs encryption and decryption using specific hardware structures to save power and time. In an embodiment, the encryption and decryption are accomplished based on highly-developed cryptography theories. For example, the encryption module 222 performs the encryption and decryption tasks based on a key known only by the eligible user. Without the key, it would be difficult or impossible for a malicious attacker to hack the storage device 220 within a finite time and steal the data in the storage device 220. In the present embodiment, the storage device 218 is encrypted each time before the user device 202 enters the hibernation mode or is shut down. In an embodiment, while the storage device 218 is in hibernation mode, the power supply to the storage device 218 is shut down. When the user device 202 is turned on or awakened from the hibernation mode, the user device 202 needs to access the key in order to decrypt the storage device 218. The key of the encryption module 222 is provided only by the company 100, e.g., via the key server 208, and is the only way to launch the operating system from the storage device 218. The user device 202 is required to link to the key server 208 of the company IT system 201 to receive the key. In an embodiment, the key of the encryption module 222 is stored in a specific location of the storage device 220 or the memory 218 and can be accessed only through an independent key protection scheme. In an embodiment, the key received from the key server 208 is utilized as an access token for authenticating the user, and another encryption/decryption key is thus enabled to perform the encryption/decryption task. In such cases, the encryption/decryption key may be a private key selected from an asymmetric encryption framework and may be implemented with equivalent circuitry such that the likelihood of stealing the key is minimized.

The power control unit 232 is regarded as another form of the monitoring entity of the user device 202. The power control unit 232 is configured to shut down the power supply 214 in response to detecting a risk condition of the user device 202. In an embodiment, the power control unit 232 is implemented as program instructions stored in the storage device 220. In an embodiment, the power control unit 232 includes a separate set of memory and processor configured to perform the power control task. In an embodiment, the power control unit 232 includes a global positioning system (GPS) receiver 250 configured to receive geographical coordinates of the user device 202 to determine the current location of the user device 202. The power control unit 232 is further configured to determine whether the current location of the user device 202 is situated within the restricted zone 102 of the company 100. If the power control unit 232 determines that the user device 202 is situated outside the restricted zone 102 of the company for a predetermined period, the power control unit 232 sends instructions to shut down or lock the output device 224 (e.g., a display of the user device 202), thereby ensuring the data safety of the user device 202.

In an embodiment, the power control unit 232 is coupled to the network interface unit 226 through the bus 230. If the power control unit 232 fails to obtain reliable measurements of the coordinate information, the power control unit 232 or the monitoring operation can still estimate the possible location through its connection with the company IT system 201 or the public network 203. For example, by accessing a Wi-Fi access point or a cellular base station, the power control unit 232 is capable of performing a rough estimation of its current location through the actual deployment coordinates of the Wi-Fi access point or the base stations.

Figure 3:
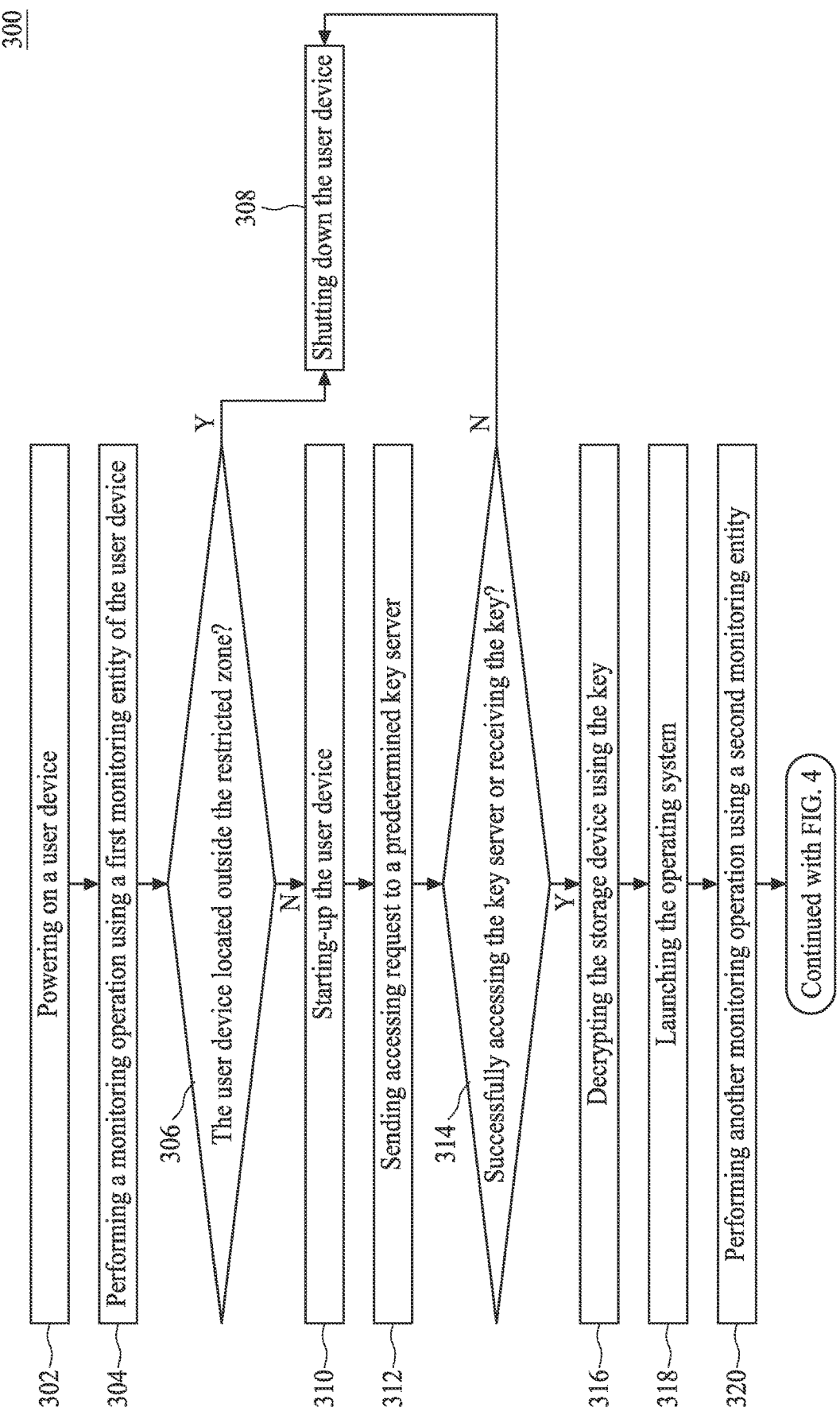
FIGS. 3 and 4 are flow diagrams of a method for protecting data of the user device in FIG. 1, in accordance with some embodiments.
Figure 4:
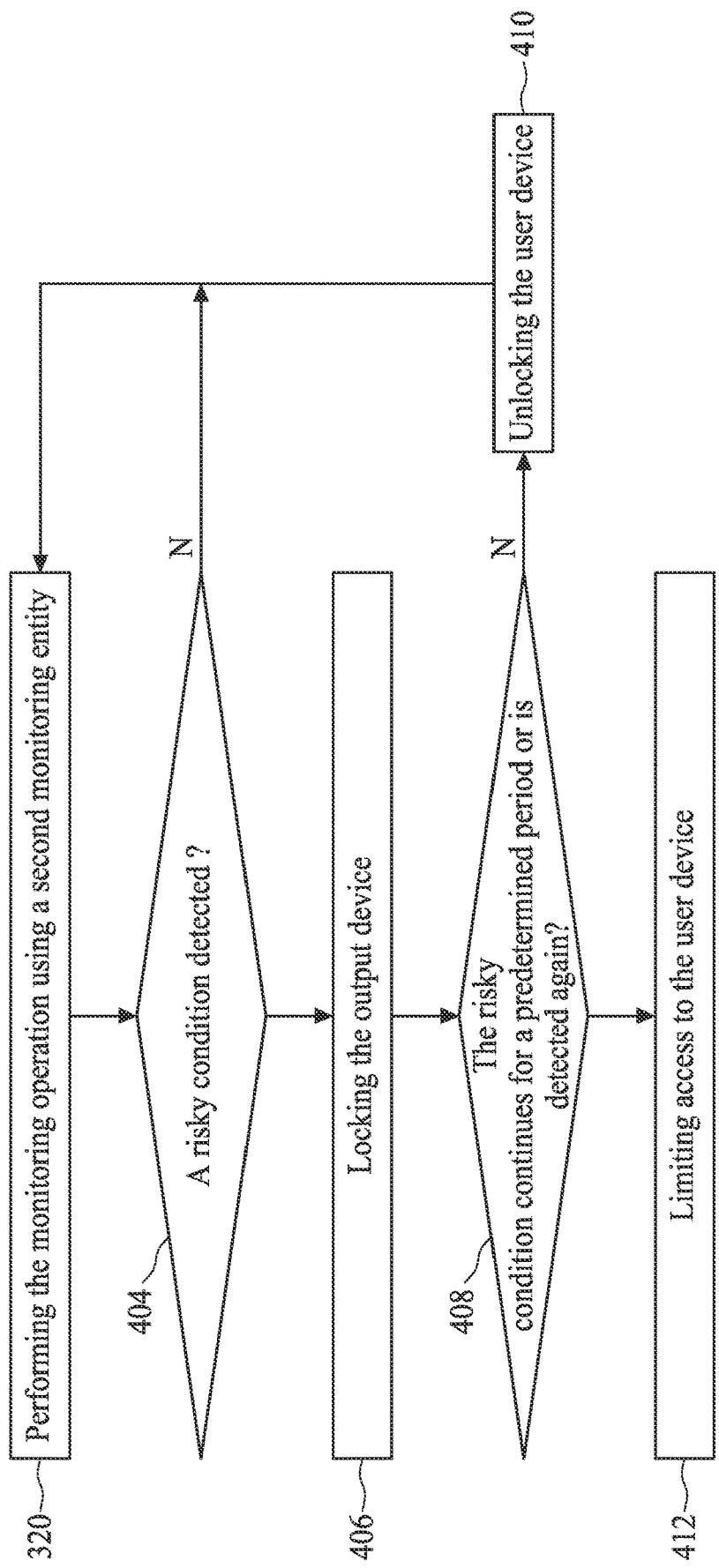

FIGS. 3 and 4 are flow diagrams of a combined method 300 for protecting data in the user device in FIG. 1, in accordance with some embodiments. It should be understood that additional operations can be provided before, during, and after the steps shown in FIGS. 3 and 4, and some of the operations described below can be replaced or eliminated for additional embodiments of the method 300. The order of the operations and processes may be interchangeable. Further, the same or similar configuration, structure, materials or operations of one embodiment may be employed in other embodiments, and the detailed explanation thereof may be omitted. In an embodiment, the device includes a storage device (e.g., the storage device 218) that is encrypted before the storage device is turned off, e.g., at the time of turning off the user device or instructing the user device to enter a hibernation mode. At step 302, the user device (such as the user device 106, 108 and 202) is powered on. At step 304, a monitoring operation is performed using a first monitoring entity of the user device. In an embodiment, the first monitoring entity is a coordinate locator, e.g., a GPS coordinate receiver or a transceiver of the power control unit 232 in FIG. 2. In an embodiment, the monitoring operation using the first monitoring entity is performed before the start-up instructions are executed or the operating system for the user device is launched. In an embodiment, the locating operation is performed in a periodic manner, such as in intervals having a period of ten seconds, 15 seconds, or other suitable periods. In an embodiment, the predetermined interval can be set as greater than or equal to zero, e.g., an even-triggered monitoring scheme can be adopted concurrently with the periodic monitoring.

At step 306, it is determined by the first monitoring entity whether the user device is located outside the restricted zone (e.g., the zone 102) defined by a data protection system. In an embodiment, the locating operation identifies the current location of the user device and determines whether the user device is within the restricted zone. If it is determined that the user device is located outside the restricted zone, the user device is shut down at step 308. In an embodiment, the first monitoring entity is a power control unit (e.g., the power control unit 232 in FIG. 2) and is configured to instruct the power supply of the user device to turn off in response to detecting the user device as being outside the restricted zone. In an embodiment, the power control unit 232 is coupled to a processor of the user device, and the processor is configured to shut down the power supply of the user device in response to receiving a shut-down request from the power control unit. In an embodiment, the user device is shut down before the start-up instructions are executed or the operating system of the user device is launched. In an embodiment, the locating operation determines whether the user device stays outside of the restricted zone for a first period of time. If the user device returns to the restricted zone before the first period expires, it is determined that the user device is not in a risk condition. In an embodiment, the first period is thirty seconds, one minute, or other suitable time periods.

If it is determined that the user device is located within the restricted zone, the user device is started up at step 310. In an embodiment, the start-up operation includes launching BIOS from the memory of the user device.

At step 312, during or after the start-up procedure of the user device, an access request is sent to a predetermined key server of the company IT system. In an embodiment, a key for decrypting the user device is requested during the access request. In an embodiment, the coverage of the key server extends only within the restricted zone defined by the company IT system. The access request may be sent through a wired or wireless network, and may be transmitted directly to the company IT system or through an intermediate public network. At step 314, it is determined if accessing the key server or reception of the key is successful. If the access to the key server is denied or the reception of the key fails, the method 300 proceeds to step 308 to shut down the user device. Otherwise, if the key is successfully received from the key server, the method 300 proceeds with step 316, in which the storage device is decrypted using the key received. At step 318, the operating system of the user device is launched.

At step 320, another monitoring operation using a second monitoring entity of the user device, e.g., a monitoring program, acting as computer instructions stored in the memory of the user device, is executed on the operating system. The method 300 proceeds with the flowchart of FIG. 4. In an embodiment, the monitoring operation performed by the second monitoring entity is according to periodic detection or an event-triggered manner. At step 404, it is determined whether a risk condition is detected. In an embodiment, the detection of the risk condition is performed for a second period of time, e.g., 15 seconds, 30 seconds, one minute, or other suitable periods.

In an embodiment, the determination of whether a risk condition of the user device is performed by detecting whether the user device is located within the restricted zone defined by the data protection system. In an embodiment, if it is detected that the user device can successfully connect to a predetermined server of the company IT system, the user device will be deemed as being located within the restricted zone. This is necessary because the network coverage of the company IT system is limited and may extend only in the restricted zone defined by the data protection system. Therefore, the virtual zone defined by the coverage of the servers of the company IT system may indicate whether the user device is situated inside the restricted zone of the company. In an embodiment, the predetermined server may be a domain controller. The term "domain" may be used to refer to a group of user devices, applications, networks, servers, and any other mechanism that are managed with a common set of rules. A domain controller is a server that manages network security of the associated domain and acts as a gatekeeper for user authentication and authorization. In some embodiments, the domain controller is a server for providing a directory service and functions as the primary mode for authenticating identities of the user device. In an embodiment, the predetermined server may include at least one of the key server, an anti-virus server and a domain name server. In other embodiments, the predetermined server includes at least one of a web server, a proxy server, a DNS server, a DHCP server, an Email server, an NTP server, a printer server, and an operation system patch server.

In an embodiment, the detection of whether the user device is located within a restricted zone is performed by detecting a physical location of the user device, e.g., through receiving the wireless communication signals from, e.g., the GPS signal, the Wi-Fi signal, the cellular network signal, the RFID signal, the NFC signal, the Bluetooth signal, the ultrasonic signal, combinations thereof or the like. The reception of the wireless signal can be achieved by, e.g., the power control unit 232, the network interface unit 224, or combinations thereof, in the user device. In an embodiment, when the user device is connected to a public network, the network address, e.g., an IP address, of the user device serves as a virtual location of the user device. Since the network address may sometimes be allocated geographically, the network address can also be leveraged in determining whether the user device is located within the restricted zone. In some embodiments, the detection of whether the user device is located within a restricted zone is performed by detecting if the user accesses to an unknown network, such as a commercial or private WiFi access point, that is not allowed for the such personal device.

In an embodiment, detecting whether the user device is located within the restricted zone is performed by authenticating a user accessing the user device. Such measure is valuable because an unknown user attempting to access the user device may represent a hacking attack. The authentication may be conducted in a password-free manner, such as based on a biometric indicator. For example, the voice, iris, fingerprint, finger vein data, palm vein data, or facial data of the user can be used individually or in combination to detect a risk condition of the user device. In an embodiment, the second monitoring entity controls an input device, such as a microphone, a lens, a camera, or a fingerprint sensor, of the user device, and second monitoring entity is coupled to the processor of the user device. The second monitoring entity is configured to request user authentication, receive the signals of the biometric indicators through the input device, and perform signal processing steps to analyze the received biometric signals.

In some embodiments, the detection of the risk condition is performed periodically. For example, the detection procedure is performed in a predetermined period of time. In alternative embodiments, the determination for the presence of the risk condition is performed based on a triggered event, such as an alarm signal indicating that the monitored user device is taken outside of the predetermined restricted zone or a response showing that the attempt to try to connect the company IT system fails. In such embodiments, a routine configured to receive the warning signal or response may be operated along with the monitoring operation.

If it is determined that at least one risk condition is detected, the method 300 proceeds with step 406 to lock the output device, such as the display. The method 300 continues with step 408 and proceeds with another round of monitoring. If it is determined that no risk condition is detected, the method 300 returns to step 320 and continues the periodic monitoring routine.

At step 408, it is determined whether the detected risk condition continues for a third predetermined period of time or is detected again based on another event-triggered signal. In an embodiment, the third period may be set as 30 seconds, one minute or other suitable periods. If it is determined that the detected risk condition continues for the third period or another risk condition is detected through another event-triggered signal, the method 300 proceeds with step 412 and limits access to the user device. In an embodiment, the limitation measures include encrypting the storage device, shutting down the user device or causing the user device to enter a hibernation mode. In some embodiments, the method 300 proceeds with limiting the user device in step 412 immediately once a first risky condition is detected and the locking of the output device may be skipped. In an embodiment, the encryption key is the same as the decryption key, such as the asymmetry decryption framework implemented with hardware, used to decrypt the storage device at the time of powering on the user device. In an embodiment, the encryption/decryption key is different from the key (token) received from the key server. In an embodiment, the encryption key is different from the decryption key but is received along with the decryption key when accessing the key server for the decryption key. In an embodiment, when the user device is powered on again, the start-up procedure is configured to allow the user device to decrypt the storage device using the encryption key only when the user device is connected to the key server. In an embodiment, the limitation measures include demounting the storage device from the user device. The demounting of the storage device may include disconnecting the storage device from the bus of the user device or removing the storage device from the hardware list of the operating system. In an embodiment, the step 412 encrypts the storage device before shutting down the power of the storage device. As such, even though a malicious attacker may turn off the user device or break down the user device and try to hack the user data of the storage device, the data of the storage device is still protected by the encryption mechanism. If it is determined that the detected risk condition does not continue, for example, the user device is moved back to the restricted zone, and the method 300 unlocks the user device at step 410.

According to an embodiment, a method of operating a user device includes: receiving a command from a user to power on the user device, wherein the user device includes information on a restricted zone associated with the user device; detecting, by a monitoring entity of the user device without involvement of any device external to the user device, whether the user device is located within the restricted zone in response to the user device being powered on and before an operating system of the user device is executed; and granting access of the user to the user device by the monitoring entity in response to detecting the user device as being within the restricted zone.

According to an embodiment, a non-transitory computer readable storage medium, including instructions which, when executed by a processor, performs steps of receiving a command from a user to power on the user device, wherein a storage device of the user device is encrypted in a power-off state; detecting, by a first monitoring operation of the user device without involvement of any device external to the user device, whether the user device is located within a restricted zone in response to the user device being powered on and before an operating system of the user device is executed; keeping the storage device encrypted, by the user device, in response to detecting the user device as being outside the restricted zone; and performing, by the user device, a second monitoring operation and detecting whether a risk condition of the user device as being located within the restricted zone exists.

According to an embodiment, a user device includes a processor; a storage device coupled to the processor; and a monitoring entity coupled to the processor and the storage device and configured to perform the steps of: detecting, without involvement of any device external to the user device, whether the user device is located within a restricted zone in response to the user device being powered on and before an operating system of the user device is executed; and granting access to the user device for executing the operating system of the user device in response to detecting the user device as being within the restricted zone.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of operating a user device, comprising:
receiving a command from a user to power on the user device, wherein the user device includes information on a restricted zone associated with the user device;
determining, by a first monitoring entity of the user device, whether the user device is located within the restricted zone through accessing a server located within the restricted zone in response to the user device being powered on and before an operating system of the user device is executed, wherein the server comprises a key server configured to store a key for encrypting or decrypting the user device; and
granting access of the user to the user device by the first monitoring entity in response to determining the user device as being within the restricted zone through successfully accessing the server.

2. The method according to claim 1, further comprising limiting access to the user device in response to determining that the user device is outside the restricted zone.

3. The method according to claim 2, wherein the limiting access to the user device comprises locking a display of the user device.

4. The method according to claim 2, wherein the user device comprises a storage device, and the limiting access to the user device comprises encrypting the storage device of the user device.

5. The method according to claim 4, further comprising decrypting the storage device and executing the operating system after determining whether the user device is located within the restricted zone.

6. The method according to claim 5, further comprising accessing the key server and decrypting the storage device using the key received from the key server.

7. The method according to claim 2, wherein the limiting access to the user device comprises either shutting down the user device or causing the user device to enter a hibernation mode.

8. The method according to claim 1, wherein the server further comprises at least one of a predetermined domain controller, a predetermined anti-virus server, a predetermined web server, a predetermined proxy server, a predetermined DNS server, a predetermined DHCP server, a predetermined Email server, a predetermined NTP server, a predetermined printer server, a predetermined operation system patch server, and a predetermined key server.

9. The method according to claim 1, wherein determining whether the user device is located within the restricted zone further comprises detecting a physical location of the user device by a second monitoring entity through receiving at least one of a GPS signal, a Wi-Fi signal, a cellular network signal, an RFID signal, an NFC signal, a Bluetooth signal, an ultrasonic signal and a network address of the user device.

10. The method according to claim 1, wherein determining whether the user device is located within the restricted zone further comprises authenticating a user accessing the user device based on a biometric indicator comprising at least one of voice, iris, fingerprint, finger vein data, palm vein data, and facial data of the user.

11. A non-transitory computer readable storage medium, comprising instructions which, when executed by a processor, performs steps of operating a user device, the steps comprising:
receiving a command from a user to power on the user device, wherein a storage device of the user device is encrypted in a power-off state;
determining, by a first monitoring operation of the user device whether the user device is located within a restricted zone through accessing a server located within the restricted zone in response to the user device being powered on and before an operating system of the user device is executed, wherein the server comprises a key server configured to store a key for encrypting or decrypting the user device;
keeping the storage device encrypted, by the user device, in response to determining the user device as being outside the restricted zone through unsuccessfully accessing the server; and performing, by the user device, a second monitoring operation and determining whether a risk condition of the user device as being located within the restricted zone exists.

12. The non-transitory computer readable storage medium according to claim 11, further comprising limiting access to the user device in response to the risk condition being detected.

13. The non-transitory computer readable storage medium according to claim 12, wherein the limiting access to the user device comprises at least one of locking an output device of the user device, encrypting the storage device, demounting the storage device and shutting down power of the storage device.

14. The non-transitory computer readable storage medium according to claim 11, further decrypting the storage device of the user device in response to determining the user device as being within the restricted zone.

15. The non-transitory computer readable storage medium according to claim 14, wherein the decrypting of the storage device of the user device comprises receiving a key associated with the storage device from the key server.

16. A user device, comprising:
a processor;
a storage device coupled to the processor; and
a monitoring entity coupled to the processor and the storage device and configured to perform the steps of:
determining whether the user device is located within a restricted zone through accessing a server located within the restricted zone in response to the user device being powered on and before an operating system of the user device is executed, wherein the server comprises a key server configured to store a key for encrypting or decrypting the user device; and
granting access to the user device for executing the operating system of the user device in response to determining the user device as being within the restricted zone through successfully accessing the server.

17. The user device according to claim 16, wherein the monitoring entity comprises a transceiver configured to provide information on a location of the user device based on at least one of a GPS signal, a Wi-Fi signal, a cellular signal, a RFID signal, a NFC signal, a Bluetooth signal, an ultrasonic signal and an IP address.

18. The user device according to claim 17, wherein the monitoring entity is further configured to perform the step of limiting access of the user device in response to determining the location of the user device as being outside the restricted zone.

19. The user device according to claim 18, further comprising an output device, wherein the monitoring entity is further configured to lock the output device in response to determining the location of the user device as being outside the restricted zone.

20. The user device according to claim 18, further comprising a power supply coupled to the monitoring entity and the storage device, wherein the monitoring entity is configured to shut down the power supply in response to detecting a physical location of the user device as being outside the restricted zone.

* * * * *